US008587969B2

(12) United States Patent
Djenguerian et al.

(10) Patent No.: US 8,587,969 B2
(45) Date of Patent: Nov. 19, 2013

(54) METHOD AND APPARATUS FOR ON/OFF CONTROL OF A POWER CONVERTER

(75) Inventors: Alex B. Djenguerian, Saratoga, CA (US); Balu Balakrishnan, Saratoga, CA (US); Erdem Bircan, San Carlos, CA (US); David Michael Hugh Matthews, Windsor (GB)

(73) Assignee: Power Integrations, Inc., San Jose, CA (US)

(*) Notice: Subject to any disclaimer, the term of this patent is extended or adjusted under 35 U.S.C. 154(b) by 209 days.

(21) Appl. No.: 13/234,058

(22) Filed: Sep. 15, 2011

(65) Prior Publication Data

US 2012/0002448 A1 Jan. 5, 2012

Related U.S. Application Data

(63) Continuation of application No. 12/816,982, filed on Jun. 16, 2010, now Pat. No. 8,031,491, which is a continuation of application No. 11/858,678, filed on Sep. 20, 2007, now Pat. No. 7,764,520.

(60) Provisional application No. 60/922,126, filed on Apr. 6, 2007.

(51) Int. Cl.
*H02M 3/335* (2006.01)

(52) U.S. Cl.
USPC .................................... 363/21.13; 363/21.16

(58) Field of Classification Search
USPC .......... 363/21.05, 21.08, 21.12, 21.13, 21.16; 323/284
See application file for complete search history.

(56) References Cited

U.S. PATENT DOCUMENTS

| | | | |
|---|---|---|---|
| 5,305,192 | A | 4/1994 | Bonte et al. |
| 5,438,499 | A | 8/1995 | Bonte et al. |
| 5,841,643 | A | 11/1998 | Schenkel |
| 6,233,161 | B1 | 5/2001 | Balakrishnan et al. |
| 6,385,059 | B1 | 5/2002 | Telefus et al. |

(Continued)

FOREIGN PATENT DOCUMENTS

| | | |
|---|---|---|
| CN | 1913312 A | 2/2007 |
| JP | 2007068395 A | 3/2007 |

OTHER PUBLICATIONS

LT1103/LT1105, Linear Technology, "Offline Switching Regulator," Linear Technology Corporation, 1630 McCarthy Blvd., Milpitas, CA 95035-7417, www.linear-tech.com, pp. 1-32.

(Continued)

*Primary Examiner* — Adolf Berhane
*Assistant Examiner* — Fred E Finch, III
(74) *Attorney, Agent, or Firm* — Blakely Sokoloff Taylor & Zafman LLP

(57) ABSTRACT

A power converter is disclosed. An example power converter includes an energy transfer element coupled between a power converter input and a power converter output. A power switch is coupled to the energy transfer element and the power converter input. A feedback sampling circuit is coupled to receive a feedback signal representative of the power converter output to generate feedback signal samples during switching cycles. A switch conduction scheduling circuit is coupled to determine enabling and disabling of the power switch in future switching cycles in response to the feedback signal samples from a present switching cycle and one or more past switching cycles. A switch conduction control circuit is coupled to enable or disable conduction of the power switch during a switching cycle to control an amount of energy transferred from the power converter input to the power converter output.

6 Claims, 8 Drawing Sheets

(56) References Cited

U.S. PATENT DOCUMENTS

| | | | | |
|---|---|---|---|---|
| 6,434,021 | B1 | 8/2002 | Collmeyer et al. | |
| 6,480,399 | B2 | 11/2002 | Balakrishnan et al. | |
| 6,862,198 | B2 | 3/2005 | Muegge et al. | |
| 6,900,995 | B2 | 5/2005 | Muegge et al. | |
| 6,911,809 | B2 | 6/2005 | Kernahan | |
| 6,990,000 | B1 | 1/2006 | Rodriguez et al. | |
| 7,233,504 | B2 | 6/2007 | Djenguerian et al. | |
| 7,259,972 | B2 | 8/2007 | Yang | |
| 7,352,595 | B2 | 4/2008 | Yang et al. | |
| 7,463,497 | B2 | 12/2008 | Negrete | |
| 7,505,287 | B1 | 3/2009 | Kesterson | |
| 7,589,983 | B1 | 9/2009 | Lin et al. | |
| 7,613,019 | B2 | 11/2009 | Kroes | |
| 7,764,520 | B2 | 7/2010 | Djenguerian et al. | |
| 2006/0022657 | A1 | 2/2006 | Sutardja et al. | |
| 2006/0268586 | A1 | 11/2006 | Mikulenka et al. | |
| 2007/0210777 | A1 * | 9/2007 | Cervera et al. | 323/284 |
| 2007/0252567 | A1 * | 11/2007 | Dearn et al. | 323/282 |
| 2008/0068868 | A1 | 3/2008 | Williams | |
| 2008/0192514 | A1 | 8/2008 | Zhou et al. | |
| 2008/0232144 | A1 * | 9/2008 | Klein | 363/49 |
| 2008/0252279 | A1 * | 10/2008 | Wang | 323/283 |

OTHER PUBLICATIONS

CN 200810100388.7—Chinese Second Office Action with English Translation, issued Nov. 16, 2012 (9 pages).

CN 200810100388.7—Chinese First Office Action with English Translation, issued Feb. 22, 2012 (17 pages).

LT1103/LT1105, Linear Technology, "Offline Switching Regulator," Linear Technology Corporation, 1630 McCarthy Blvd., Milpitas, CA 95035-7417, www.linear-tech.com, pp. 1-32, 1992.

Bindra, A., "Power Supply Controller Keeps Efficiency High Across All Loads: Using digital regulation, this power controller yields high performance at low loads with unconditional stability," Analog, Power Devices & DSP, Electronic Design, Dec. 3, 2001, pp. 50-52.

iWatt, "iW2201—Digital SMPS Controller: Preliminary Data," Revision 1.1, pp. 1-13.

iWatt, "iW2202—Digital SMPS Controller: Preliminary Data," Revision 1.0, pp. 1-14.

JP 2008-099707—Japanese Office Action with English Translation, mailed Apr. 2, 2013 (5 pages).

* cited by examiner

State Machine changes state (S) when it receives the indicated number (3 or 7) of consecutive low (L) or high (H) values of $U_{FB}$*

| State | $I_{LIMIT}$ | $U_{FB}$* Low | $U_{FB}$* High |
|---|---|---|---|
| S1 | 100% | Enable 1 | Disable 1 |
| S2 | 100% | Enable 1 | Disable 2 |
| S3 | 90% | Enable 1 | Disable 1 |
| S4 | 90% | Enable 1 | Disable 2 |
| S5 | 80% | Enable 1 | Disable 1 |
| S6 | 80% | Enable 1 | Disable 2 |
| S7 | 70% | Enable 1 | Disable 1 |
| S8 | 70% | Enable 1 | Disable 2 |
| S9 | 70% | Enable 1 | Disable 4 |
| S10 | 70% | Enable 1 | Disable 8 |
| S11 | 70% | Enable 1 | Disable 16 |
| S12 | 70% | Enable 1 | Disable 32 |
| S13 | 70% | Enable 1 | Disable 64 |
| S14 | 70% | Enable 1 | Disable 128 |

FIG. 7B

METHOD AND APPARATUS FOR ON/OFF CONTROL OF A POWER CONVERTER

RELATED APPLICATION

This application is a continuation of U.S. application Ser. No. 12/816,982, filed Jun. 16, 2010, now pending which is a continuation of U.S. application Ser. No. 11/858,678, filed Sep. 20, 2007, entitled "Method and Apparatus for On/Off Control of a Power Converter," now issued as U.S. Pat. No. 7,764,520 B2, which claims benefit of U.S. Provisional Application No. 60/922,126, filed Apr. 6, 2007, entitled "Method And Apparatus For On/Off Control Of A Power Converter". U.S. application Ser. Nos. 12/816,982 and 60/922,126 and U.S. Pat. No. 7,764,520 B2 are hereby incorporated by reference.

BACKGROUND INFORMATION

1. Field of the Disclosure

The present invention relates generally to switching power converters and, more specifically, the present invention relates to a technique to regulate an output of a switching power converter.

2. Background

Many electrical devices such as cell phones, personal digital assistants (PDA's), laptops, etc. are powered by a source of relatively low-voltage DC power. Because power is generally delivered through a wall outlet as high-voltage AC power, a device, typically referred to as a power converter, is required to transform the high-voltage AC power to low-voltage DC power. The low-voltage DC power may be provided by the power converter directly to the device or it may be used to charge a rechargeable battery that, in turn, provides energy to the device, but which requires charging once stored energy is drained. Typically, the battery is charged with a battery charger that includes a power converter that meets constant current and constant voltage requirements required by the battery. In operation, a power converter may use a controller to regulate output power delivered to an electrical device, such as a battery, that may be generally referred to as a load. More specifically, the controller may be coupled to a sensor that provides feedback information of the output of the power converter in order to regulated power delivered to the load. The controller regulates power to the load by controlling a power switch to turn on and off in response to the feedback information from the sensor to transfer energy pulses to the output from a source of input power such as a power line.

One particular type of power converter that may be used is a flyback power converter. In a flyback power converter, an energy transfer element separates the input of the power converter from the output of the power converter. The energy transfer element typically provides isolation that prevents DC current from flowing between the input and the output. In applications where isolation is not required, the input and the output may share a common return terminal that allows DC current to flow between the input and the output. A switching power converter produces an output by periodically switching a power switch for one or more switching cycles. An on/off control technique that regulates an output of a switching power converter is one that enables or disables conduction of the power switch within a particular switching cycle. When enabled, the power switch may conduct current within a switching cycle. When disabled, there is no conduction for the entire duration of the switching cycle.

A current limited on/off control is one that terminates the conduction of the power switch within an enabled switching cycle when the current in the switch reaches a current limit. When conduction is enabled, the power switch may conduct within the switching cycle until the current in the power switch reaches a current limit or until the conduction time reaches a maximum value.

An apparatus to implement an on/off control technique in a power converter is generally referred to as an on/off controller. A typical on/off controller decides whether to enable or to disable the conduction of the power switch for each switching cycle by sensing the output of the power converter at the end of the previous switching cycle. The controller may also set the current limit of the switch to control the energy delivered to the output in each switching cycle. By controlling the energy delivered to the output in a given cycle, the output may be influenced, thereby having an effect on whether conduction of the power switch is enabled or disabled in subsequent switching cycles. On/Off control has advantages over alternatives in many applications that demand special combinations of features such as simplicity, low cost, fast transient response, and low power consumption at no load.

BRIEF DESCRIPTION OF THE DRAWINGS

Non-limiting and non-exhaustive embodiment and examples of the present invention are described with reference to the following figures, wherein like reference numerals refer to like parts throughout the various views unless otherwise specified.

FIG. 7B shows example parameters that correspond to each state of the example state diagram of FIG. 7A.

DETAILED DESCRIPTION

Figure 1:
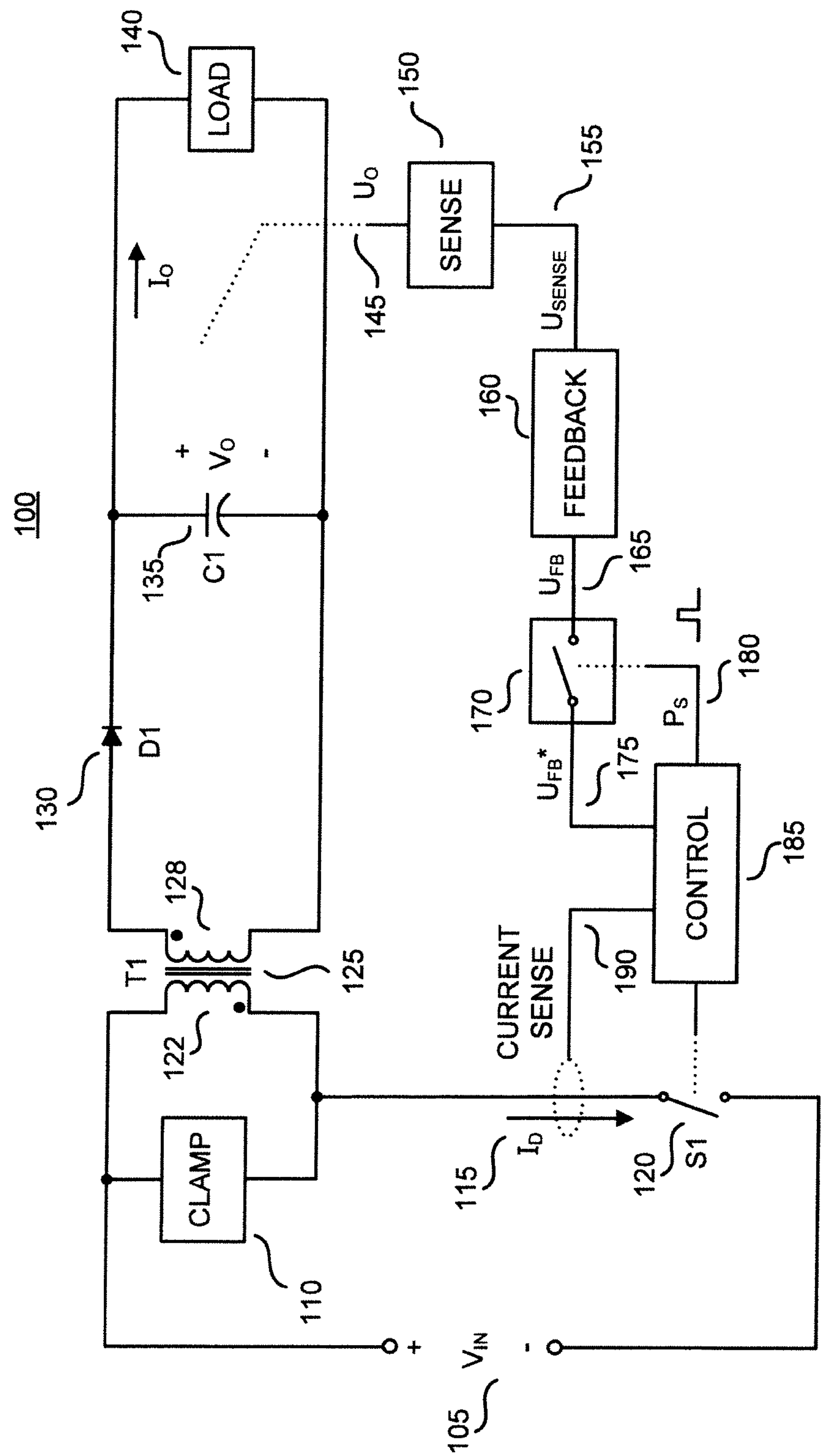
FIG. 1 shows generally one example of a switching power converter that uses a flyback topology and employs a control technique in accordance with the teachings of the present invention.

Methods and apparatuses for implementing an on/off control technique for a power converter in accordance with the present invention are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

As will be discussed, examples according to the teachings of the present invention include a power converter controller including on/off control that enables or disables conduction of a power switch for one or more future switching cycles, not just for the present switching cycle. "On/off" herein refers to whether the power switch is enabled to conduct. An "on" cycle is one wherein the power switch is enabled, and therefore, may conduct during that cycle and an "off" cycle is one wherein the power switch is disabled, or prevented from conducting. Thus, "on/off" in the present disclosure does not refer to whether the power switch is, in fact, conducting in a given cycle, only whether or not conduction of the power switch is enabled. In one example, the on/off control senses the output of the power converter only during an enabled cycle of the power switch, and then determines the number of future cycles of the power switch to be enabled or disabled in response to the samples of a sensed feedback signal in the present and past switching cycles. Thus, the on/off control may schedule future switching cycles to be enabled and disabled in response to a history of events that may include past and present samples of a sensed feedback signal as well as past and present values of a current limit of the power switch. An advantage of the example on/off control is that it does not need to sense the output for future disabled cycles. The reduction or elimination of the need to sense the output at each switching cycle reduces the number of components and improves sensing accuracy in accordance with the teachings of the present invention. Thus, improved regulation at lower cost and higher efficiency compared to known solutions is provided.

To illustrate, FIG. 1 shows one example of a regulated switching power converter 100, sometimes referred to as a power supply, in accordance with the teachings of the present invention. In the particular example shown in FIG. 1, switching power converter 100 is a power converter having a flyback topology. It is appreciated, however, that there are many other known topologies and configurations of switching power supplies that could also employ on/off control in accordance with the teachings of the present invention, and that the flyback topology shown in FIG. 1 is provided for explanation purposes.

The power converter in FIG. 1 provides output power to a load 140 from an unregulated input voltage $V_{IN}$ 105. The input voltage $V_{IN}$ 105 is coupled to an energy transfer element T1 125 and a power switch S1 120, hereinafter referred to as the switch S1 120. In the example of FIG. 1, the energy transfer element T1 125 is a transformer with a primary winding 122 and a secondary winding 128. A "primary winding" may also be referred to as an "input winding" and a "secondary winding" may also be referred to as an "output winding." A clamp circuit 110 is coupled to the primary winding 122 of the energy transfer element T1 125 to limit the maximum voltage on the switch S1 120. Switch S1 120 is closed, thereby allowing current to be conducted through the switch, and opened, thereby substantially terminating conduction through the switch, in response to a control block 185. Thus, a switch that is closed may be referred to as being "on," whereas a switch that is open may be referred to as being "off." In one example, switch S1 120 is a transistor. In one example, control block 185 may be implemented as an integrated circuit or may be implemented with discrete electrical components or a combination of discrete and integrated circuits. During operation of the power converter, the switching of switch S1 120 produces pulsating current in the rectifier D1 130 that is filtered by capacitor C1 135 to produce a substantially constant output voltage $V_O$ or output current $I_O$ at the load 140.

The output quantity to be regulated is $U_O$ 145, which in general could be an output voltage $V_O$, an output current $I_O$, or a combination of the two. A sense circuit 150 is coupled to sense the output quantity $U_O$ 145 as a sense signal $U_{SENSE}$ 155.

As shown in the depicted example, a feedback circuit 160 is coupled to the sense signal $U_{SENSE}$ 155 to produce a feedback signal $U_{FB}$ 165 that is sampled by a feedback sampling circuit 170. A sampled feedback signal $U_{FB}$* 175 is an input to a control block 185. The sampled feedback signal $U_{FB}$* 175 gives an indication of the magnitude of the power converter output, such as for example whether the output is higher or lower than a reference value. Another input to control block 185 is a current sense signal 190 that senses a current ID 115 in the switch S1 120. Any of the many known ways to measure a switched current, such as for example a current transformer, or the voltage across a discrete resistor, or the voltage across a transistor when the transistor is conducting, may be used to measure the current ID 115. A sampling signal $P_S$ 180 from control block 185 activates the feedback sampling circuit 170 to sample the feedback signal $U_{FB}$.

In operation, the control block 185 operates switch S1 120 to substantially regulate the output $U_O$ 145 to its desired value. Control block 185 typically includes an oscillator that defines a switching cycle of duration T. Regulation is accomplished by control of one or more switching parameters that determine the amount of energy transferred from the input to the output of the power converter. In one example, the maximum value of current $I_D$ 115 is controlled. In one example, the switch S1 120 is controlled to conduct for a portion of a switching cycle or to have no conduction in a switching cycle.

Figure 2:
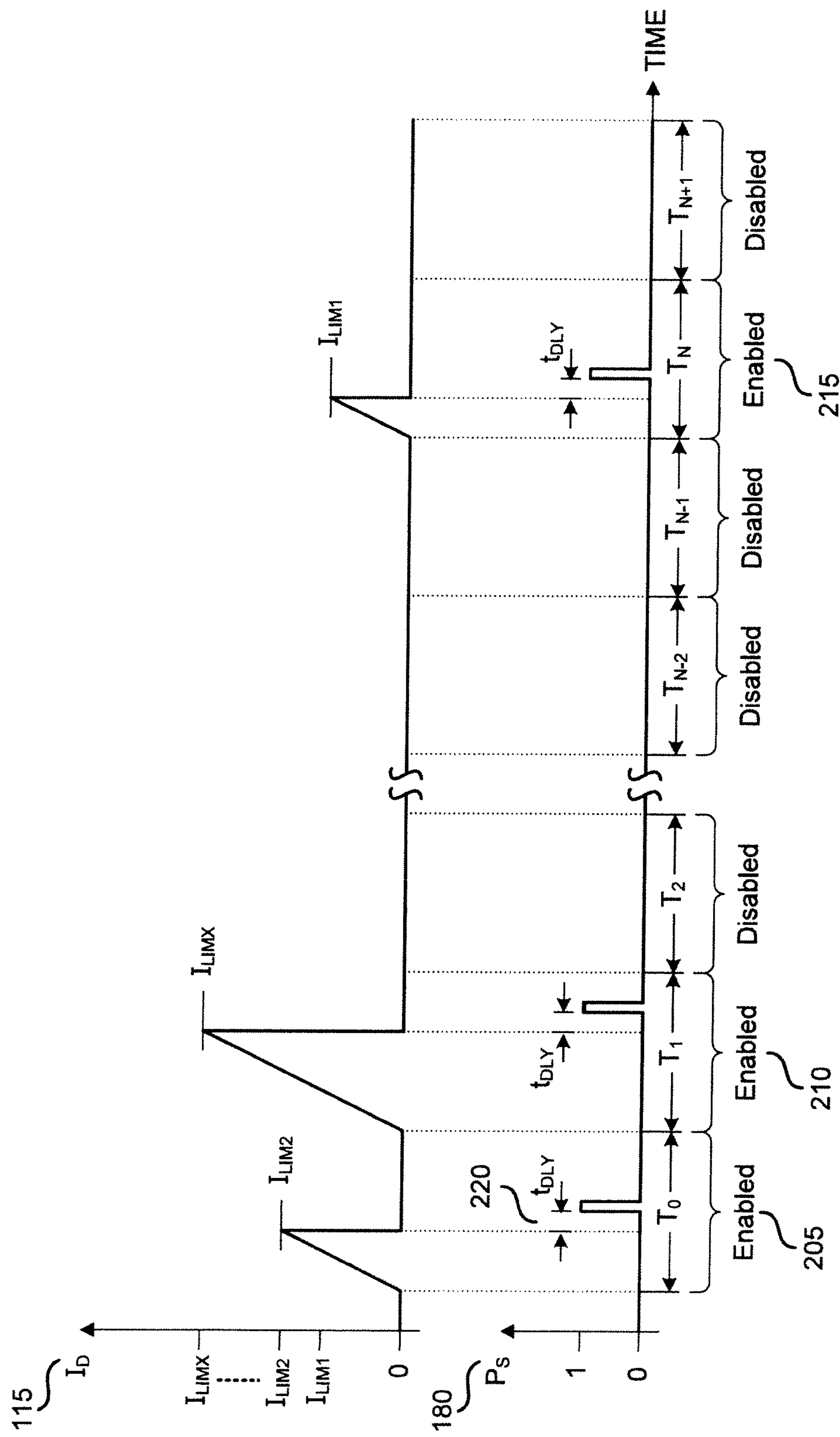
FIG. 2 shows several switching cycles of waveforms from an example switching power converter operating in accordance with the teachings of the present invention.

FIG. 2 shows generally several switching cycles with waveforms of the current $I_D$ 115 and the sampling signal $P_S$ 180 from the switching power converter example of FIG. 1. As shown in the described example, a switching cycle where the current $I_D$ 115 is greater than zero is referred to as an "Enabled" cycle. Thus, the switch is conducting during at least a portion of an Enabled cycle. A switching cycle where current $I_D$ 115 is not substantially greater than zero is referred to as a "Disabled" cycle. A "Disabled" cycle may also be referred to as a "Skipped" cycle. A Disabled cycle is one that has the conduction of switch S1 120 disabled. Thus, the switch is prevented from conducting, for example by being held off or prevented from being turned on, during the entirety of a Disabled cycle.

During each Enabled cycle, switch S1 120 conducts current ID 115 until the current $I_D$ 115 reaches one of a plurality of current limit values ranging from a lower value $I_{LIM1}$ through a higher value $I_{LIMX}$. The control block 185 sets the current limit in each Enabled cycle to a value that achieves the desired behavior of the power converter. In the example illustrated in FIG. 2, the current limit is set to $I_{LIM2}$ in the Enabled cycle $T_0$ 205, the current limit is set to $I_{LIMX}$ in the Enabled cycle $T_1$ 210, and the current limit is set to $I_{LIM1}$ in the Enabled cycle $T_N$ 215.

In one example, the sampling signal $P_S$ 180 activates the feedback sampling circuit 170 to sample the feedback signal $U_{FB}$ 165 in each Enabled cycle after a delay time $t_{DLY}$ 220 from the time that switch S1 120 terminates its conduction.

Figure 3:
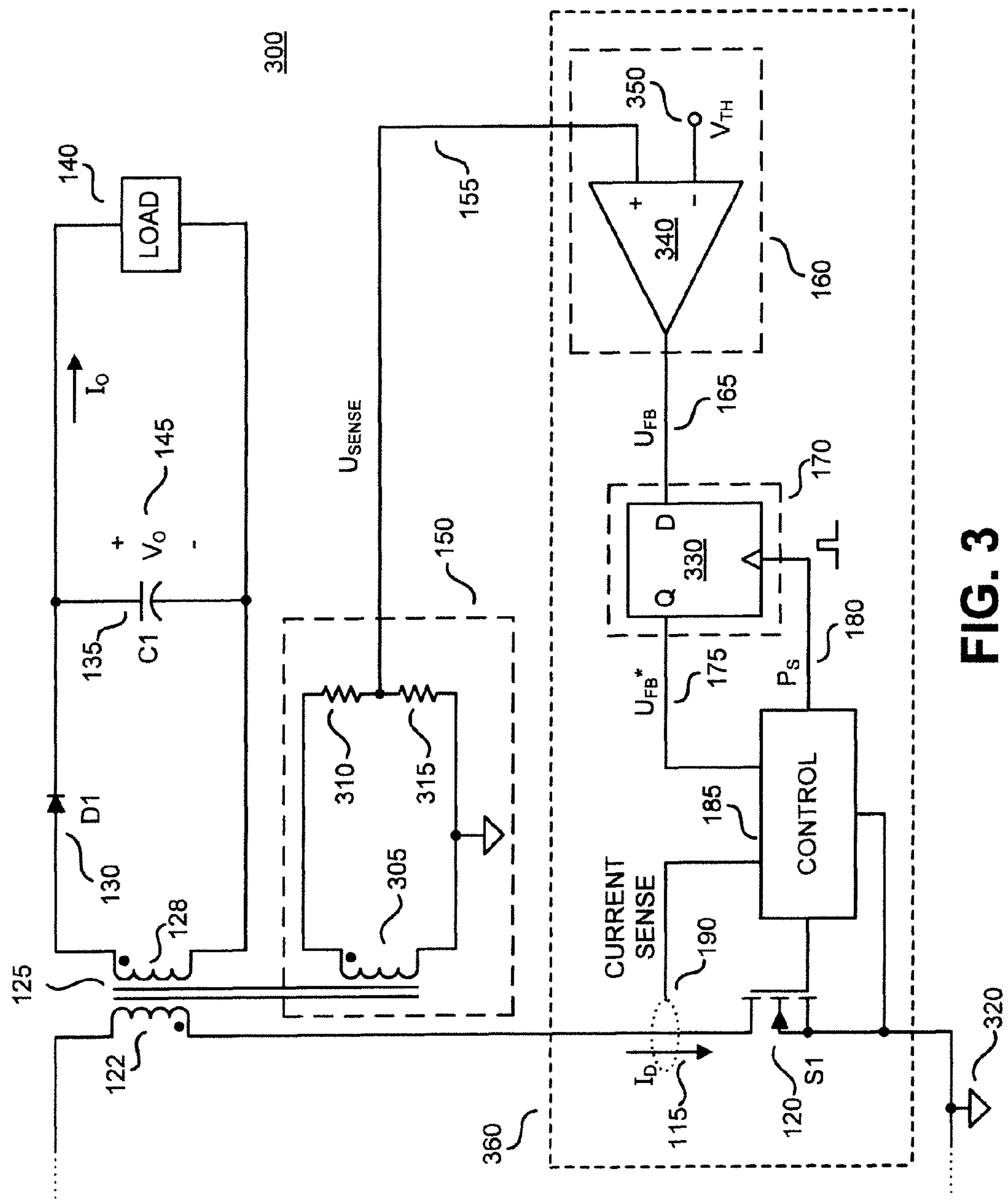
FIG. 3 shows an example portion of an example power converter employing a control technique in accordance with the teachings of the present invention.

FIG. 3 shows an example portion 300 of the example power converter of FIG. 1 in greater detail. In FIG. 3, the sense circuit 150 includes a sense winding 305 on the transformer 125 to sense the output quantity 145 that is a voltage $V_O$ on the capacitor C1 135. Resistors 310 and 315 produce the sense signal $U_{SENSE}$ 155 that is received by feedback circuit 160. In one example, sense signal $U_{SENSE}$ 155 is a voltage. In another example, sense signal $U_{SENSE}$ is a current. In one example, feedback circuit 160 includes a voltage comparator 340 that compares the voltage of sense signal $U_{SENSE}$ 155 to a threshold voltage $V_{TH}$ 350, with both voltages measured with respect to a common input return 320. The output of comparator 340 is the feedback signal $U_{FB}$ 165. In the example, feedback signal $U_{FB}$ 165 is high when the sense signal $U_{SENSE}$ 155 is greater than the threshold voltage $V_{TH}$ 350, and feedback signal $U_{FB}$ 165 is low when the sense signal $U_{SENSE}$ 155 is less than the threshold voltage $V_{TH}$ 350.

In the illustrated example, the feedback sampling circuit 170 is a D flip-flop 330 that receives the feedback signal $U_{FB}$ 165 to produce the sampled feedback signal $U_{FB}$* 175 when the sampling signal $P_S$ 180 from control block 185 clocks the D flip-flop 330. Thus, the sampled feedback signal $U_{FB}$* indicates the magnitude of the output in accordance with the teachings of the present invention.

In the example of FIG. 3, switch S1 120 is a Metal Oxide Semiconductor Field Effect Transistor (MOSFET). In the example of FIG. 3, the broken line 360 may represent the boundary of an integrated circuit that includes switch S1 120, control block 185, current sense signal 190, feedback sampling circuit 170, and feedback circuit 160 in a single monolithic device. In other examples, one or more of these functional blocks may be implemented with discrete circuit components, monolithic integrated circuits, hybrid integrated circuits, or various combinations thereof.

Figure 4:
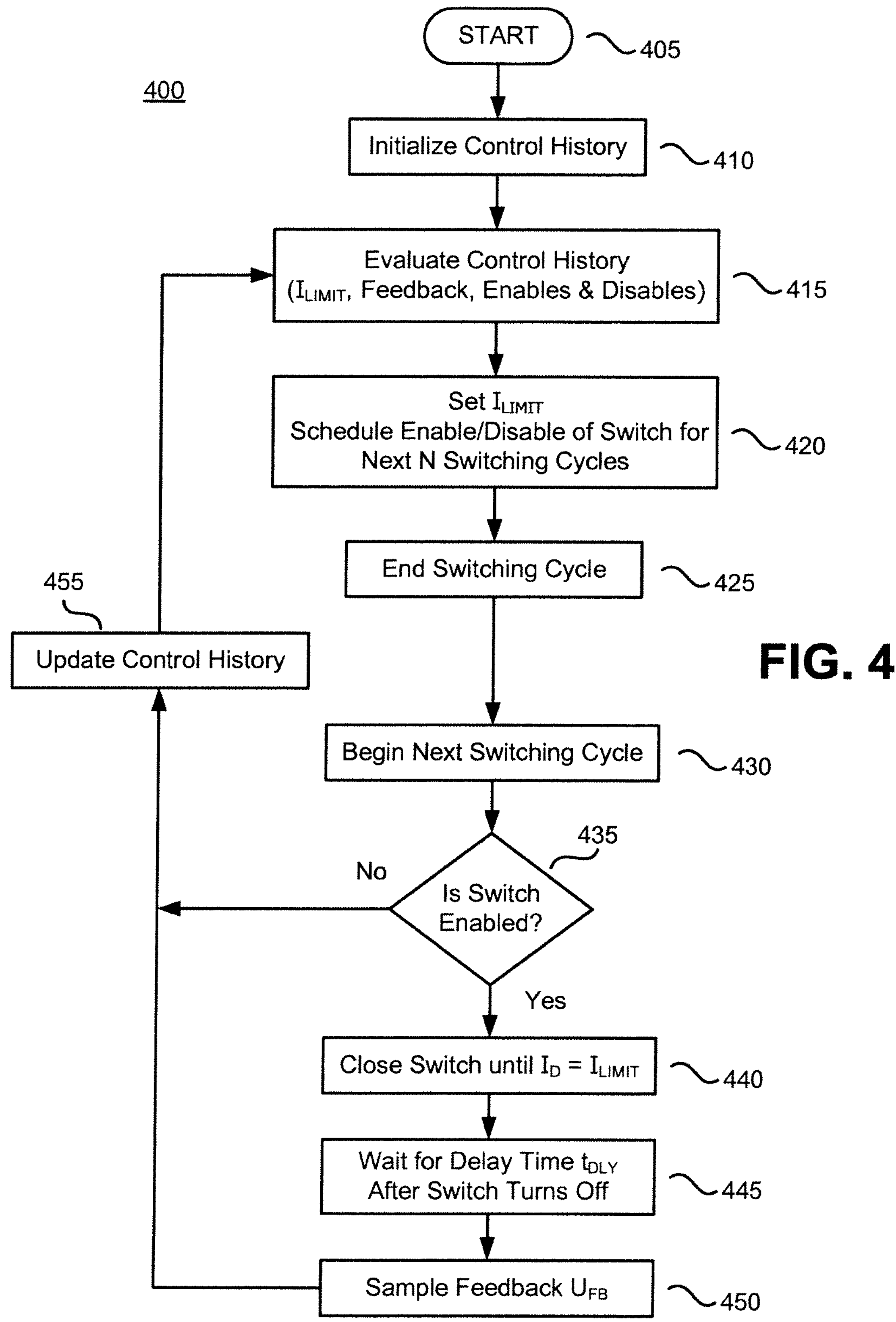
FIG. 4 shows an example flow diagram 400 that describes a method to regulate an output of a switching power converter in accordance with the teachings of the present invention.

FIG. 4 shows an example flow diagram 400 that describes a method to regulate an output of a switching power converter with on/off control in accordance with the teachings of the present invention. After starting in block 405, all stored information from previous switching cycles included in the control history is reset to a set of initial conditions in block 410. The control history is a memory of one or more past events that may include current limits, values of the sampled feedback signal, the number of enabled and disabled switching cycles, and any other information useful to determine future enabled and disabled switching cycles to meet the regulation requirements of a given application. In one example, the control history is contained in the state of a digital state machine. The control proceeds to block 415 where conditions and information stored from previous switching cycles are evaluated. Next, the parameters for subsequent switching cycles are set in block 420. These parameters may include the current limit and the decision to schedule the switch to be enabled or disabled for one or more future switching cycles. Block 425 marks the end of the present switching cycle. A new switching cycle starts in block 430.

Block 435 branches the control to either block 440 or block 455. If the parameters set in block 420 indicate that the switch is scheduled to be enabled at the next switching cycle, then the control branches to block 440. If the parameters set in block 420 indicate that the switch is scheduled to be disabled for the next switching cycle, then the control branches to block 455.

When the switch is enabled, block 440 turns on the switch, allowing it to conduct, until the current in the switch reaches the current limit. When the current in the switch reaches the current limit, conduction is terminated, for example by turning the switch off. Then the control moves to block 445 to wait for a delay time before moving to block 450 where it samples the feedback signal $U_{FB}$. Control continues after feedback sampling to block 455 where the control history is updated. The control history is then evaluated in block 415 to continue the operation through block 420 before reaching the end of the switching cycle in block 425 and starting a new switching cycle in block 430.

Figure 5:
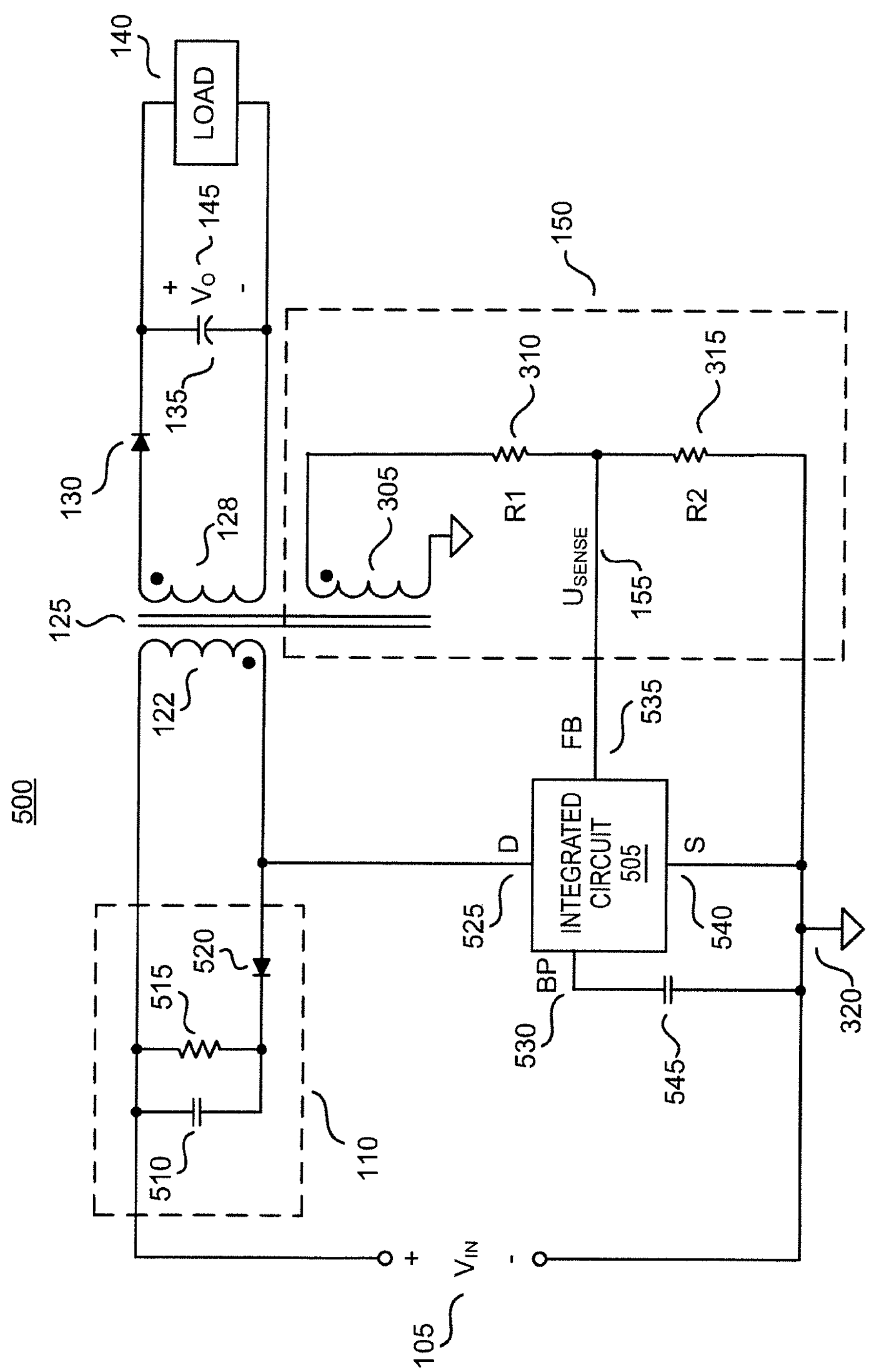
FIG. 5 shows generally an example power converter that includes an example integrated circuit that implements a control technique in accordance with the teachings of the present invention.

FIG. 5 shows generally one example of a power converter 500 that has switching, feedback and control functions included in an integrated circuit 505 in accordance with the teachings of the present invention. In one example, the input voltage $V_{IN}$ 105 is between 120 volts and 375 volts. In one example, the output voltage $V_O$ 145 is approximately 5 volts. As shown in the illustrated example, clamp circuit 110 of the power converter 500 includes a capacitor 510, a resistor 515, and a rectifier 520. Integrated circuit 500 includes a drain terminal 525 coupled to one end of the primary winding 122, a source terminal 540 coupled to the common input return 320, a bypass terminal 530 coupled to a capacitor 545, and a feedback terminal 535 coupled to receive the sense signal $U_{SENSE}$ 155 from the sense circuit 150.

Figure 6:
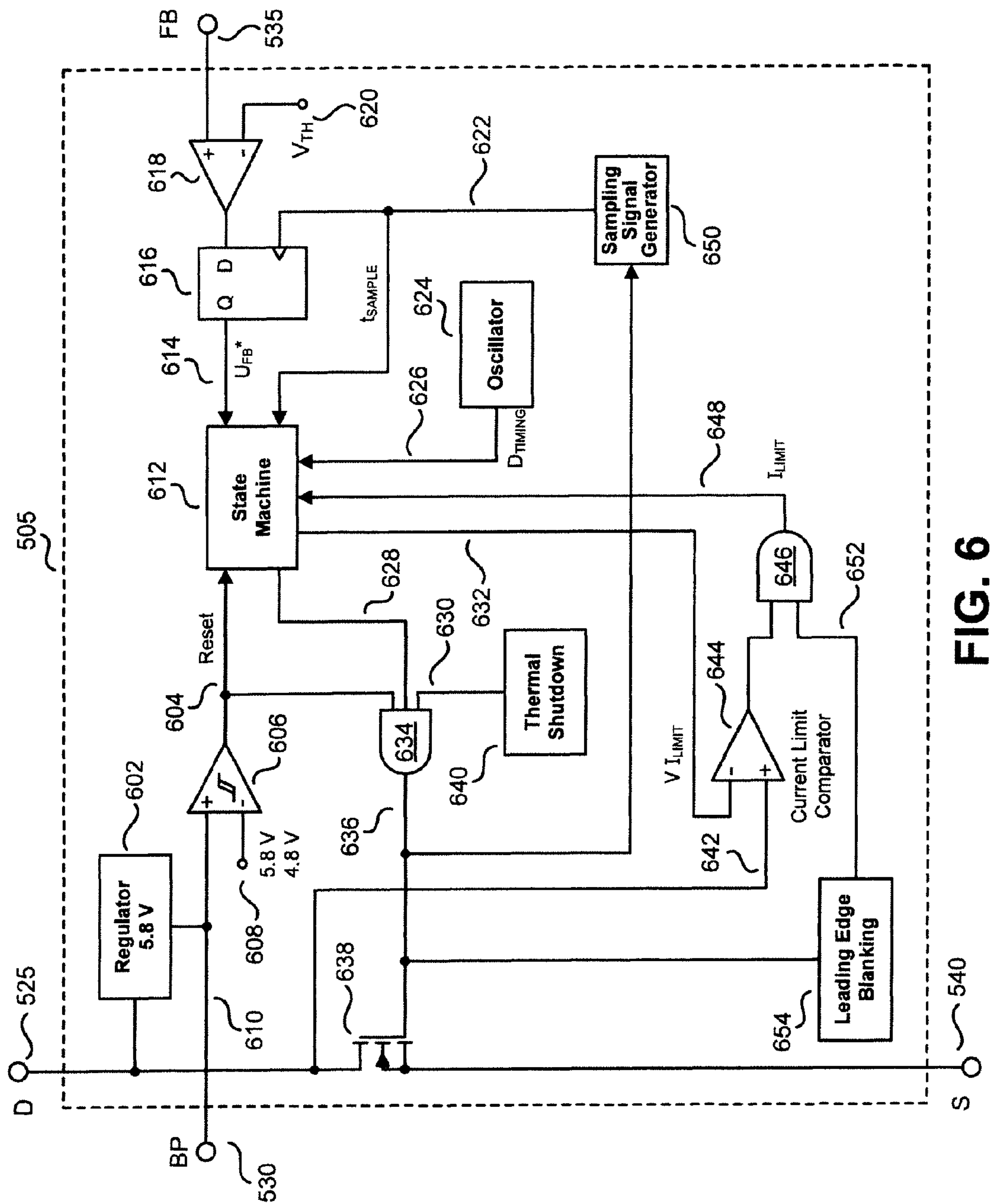
FIG. 6 shows internal details of an example integrated circuit that implements a control technique in accordance with the teachings of the present invention.

FIG. 6 shows internal details of example integrated circuit 505 to describe its operation. In the example, a power MOSFET 638 switches current between the drain terminal 525 and the source terminal 540 in response to a switching signal 636 from an AND gate 634. An optional voltage regulator 602 coupled to the drain terminal 525 regulates the voltage on the bypass terminal 530 to 5.8 volts when the MOSFET 638 is off. Bypass terminal 530 provides an internal supply voltage 610 to power the internal circuits of integrated circuit 505. An external capacitor 545 shown in FIG. 5 coupled to the bypass terminal 530 stores energy to power the internal circuits while the MOSFET 638 is on.

An optional hysteretic comparator 606 monitors the internal supply voltage 610 against a reference voltage 608. The hysteresis of comparator 606 causes reference voltage 608 to be either 4.8 volts or 5.8 volts. The output 604 of hysteretic comparator 606 goes low to turn off the MOSFET 638 through AND gate 634 when the internal supply voltage 610 falls below 4.8 volts. When the internal supply voltage 610 rises to 5.8 volts, the output 604 of hysteretic comparator 606 goes high, and the reference voltage 608 drops to 4.8 volts.

As shown in the depicted example, the output of hysteretic comparator 606 provides a reset signal 604 to a state machine 612. It is appreciated that in other examples, other internal or external circuits may provide the reset signal 604 as necessary for a given application. A transition from low to high of reset signal 604 initializes the state machine 612. In one example, the state machine 612 uses ordinary digital circuits such as for example logic gates, flip-flops, latches, counters, and the like, to produce outputs and schedule future switching cycles that are enabled or disabled in response to past and present digital input samples from the feedback sampling circuitry to provide on/off control of the power converter in accordance with the teachings of the present invention.

The AND gate 634 receives the reset signal 604, a thermal shutdown signal 630 from an optional thermal shutdown circuit 640, and an output signal 628 from the state machine 612. The switching signal 636 from the output of AND gate 634 goes low to turn off the MOSFET 638 whenever either the reset signal 604 or the thermal shutdown signal 630 goes low. The thermal shutdown circuit 640 causes the thermal shutdown signal 630 to go low when the junction temperature of the integrated circuit exceeds a threshold temperature value. Thus, the thermal shutdown circuit 640 causes the MOSFET 638 to turn off when the junction temperature of the integrated circuit is too high.

As shown in the depicted example, an oscillator 624 provides a digital timing signal $D_{TIMING}$ 626 to the state machine 612. In the depicted example, digital timing signal 626 determines both the start of each switching cycle and the maximum time the MOSFET 638 may be turned on in each switching cycle. As will be understood, oscillator 624 could optionally provide separate signals to control the initiation of a cycle and the maximum on time. In one example, the duration of each switching cycle is approximately 15 microseconds.

Comparator 618 compares a sense signal at the feedback terminal 535 to a threshold $V_{TH}$ 620. D flip-flop 616 samples the output of comparator 618 to produce a sampled feedback signal $U_{FB}$* 614 at a sampling time determined by a sampling signal 622. The sampling time is the time the MOSFET 638 turns off, delayed by a sample delay time. Sampling signal generator 650 delays the signal 636 at the gate of MOSFET 638 by the sample delay time, and generates the sampling signal 622 at the delayed falling edge of the signal 636. In one example, the sample delay time is 2.5 microseconds.

Current limit comparator 644 compares a signal 642, which is proportional to the current in the MOSFET 638, with a current limit reference 632 from the state machine 612. In one example, the current limit reference 632 is based on a current state of the state machine 612. The output of the current limit comparator 644 goes high to indicate when the current in MOSFET 638 reaches the current limit reference value 632. Switching signal 636 is delayed by leading edge blanking circuit 654 before being applied to the input 652 of AND gate 646 to prevent the current limit input 648 to the state machine 612 from indicating a false current limit condition when MOSFET 638 momentarily discharges stray capacitance as it turns on. In response to current limit input 648 indicating that the current in MOSFET 638 has reached the current limit reference value 632, state machine 612 instructs the switch to terminate its conduction through operation of signal 628 and AND gate 634.

As shown in the illustrated example, the state machine 612 includes two outputs. A first output 628 is gated by AND gate 634 to turn the MOSFET 638 on and off. A second output 632 sets the reference of the current limit comparator 644. Thus, the state machine 612 enables or disables the MOSFET 638 from conducting in each switching cycle, controls the termination of conduction during an enabled cycle, and also sets the current at which the MOSFET 638 turns off after it is enabled in accordance with the teachings of the present invention.

Figure 7A:
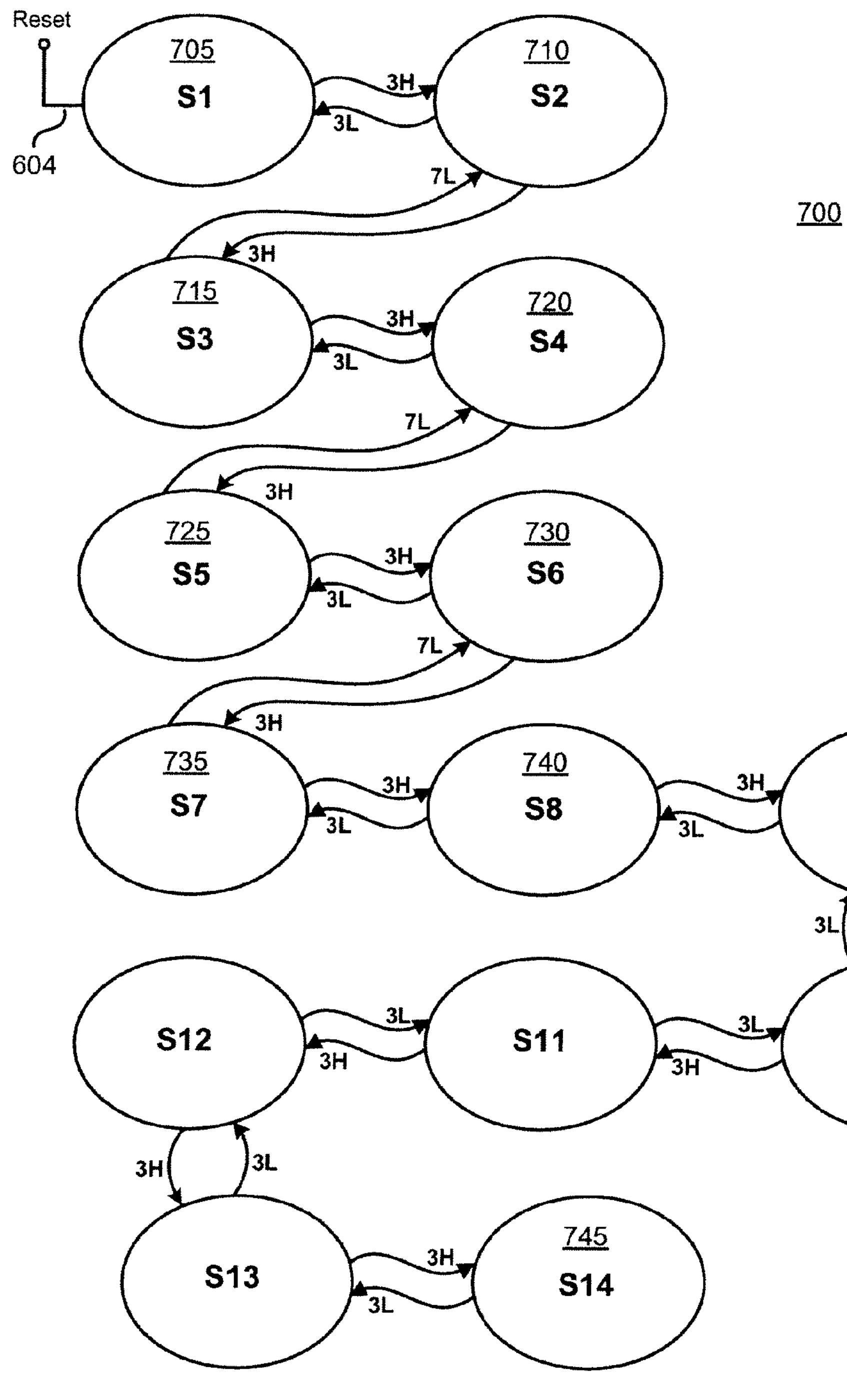
FIG. 7A shows generally a state diagram of one example of the state machine of an example integrated circuit that implements a control technique in accordance with the teachings of the present invention.

FIG. 7A shows an example state diagram 700 that describes states S1 705 through S14 745 and the example conditions to transition between the states S1 705 through S14 745 of one example of the state machine 612 in the integrated circuit of FIG. 6 in accordance with the teachings of the present invention. FIG. 7B shows examples of parameters that correspond to each state of the state diagram 700. In the examples shown in FIG. 7B, the current limit $L_{LIMIT}$ of the switch S1 120 for each state is given as a percentage of the current limit value $I_{LIMX}$ in accordance with the teachings of the present invention. FIG. 7B also shows for each state example numbers of future switching cycles scheduled to be enabled or disabled after the state machine receives a low or a high level sampled feedback signal $U_{FB}$* 614 in accordance with the teachings of the present invention.

At the start of operation, reset signal 604 sets the state machine 612 to the S1 state 705. The state machine 612 transitions states when it receives a number of consecutive high or low values of the sampled feedback signal $U_{FB}$* 614. In the example of FIG. 7A, either three or seven consecutive high or low values of the sampled feedback signal $U_{FB}$* 614 are required to transition states as indicated in the state diagram 700.

In all states of this example, when the sampled feedback signal $U_{FB}$* 614 is sampled low in a given switching cycle, the next switching cycle is an Enabled cycle. When the sampled feedback signal $U_{FB}$* is sampled high in a switching cycle, a predetermined number of subsequent switching cycles are Disabled cycles. At least one Enabled cycle immediately follows the predetermined number of Disabled cycles. It is appreciated that the low and high logical values can be easily reversed with appropriate logical inversions in the circuit. The number of subsequent switching cycles that are Disabled cycles depends on each particular state. In the example illustrated in FIG. 7A and FIG. 7B, the number of Disabled cycles generally increases in the higher numbered states. However, since there are four different current limit levels in the example, 70%, 80%, 90%, and 100% of current limit $I_{LIMX}$, the number of Disabled cycles decreases when transitioning from state S2 710 to S3 715, and from S4 720 to S5 725, and from S6 730 to S7 735, in other words when transitioning to a state with a lower current limit. Starting at state S7 735, when the current limit is at its lowest setting, the number of Disabled cycles is increased in binary powers, doubling from one Disabled cycle to two Disabled cycles in S8 740 and continuing to 128 Disabled cycles in the highest state S14 745. It is appreciated that the increase of Disabled cycles in binary powers is a matter of convenience in this example and other examples may use different schedules for future Disabled cycles.

When the power converter 500 has its maximum load, the state machine 612 will be in state S1 705 where the current limit is highest and the number of Disabled cycles is lowest (only one Disabled cycle per feedback sample). When the power converter 500 has its minimum load, the state machine 612 will be in the highest state S14 745. In the illustrated example, state S14 745 has the lowest current limit and the highest number of Disabled cycles per high feedback sample.

To transition from one state to another state, the example state machine 612 receives two or more consecutive high or low values of the sampled feedback signal $U_{FB}$* 614. For example, three consecutive high values of $U_{FB}$* 614 (i.e. no low value in the present and past two switching cycles) will cause the state machine 612 to transition from state S1 705 to state S2 710, whereas three consecutive low values of $U_{FB}$* 615 (i.e. no high value in the present and past two switching cycles) will cause the state machine 612 to transition from state S2 710 to state S1 705. In most cases of the example illustrated in FIG. 7A and FIG. 7B, three consecutive high or low values are needed to transition between states. Three exceptions are from state S3 715 to state S2 710, from state S5 725 to state S4 720, and from state S7 735 to state S6 730. In these cases, the number of consecutive low cycles is increased from three to seven to avoid excessive changes between states that have different current limits. Excessive changes between such states can produce patterns of switching cycles that degrade the performance of the power converter through reduced efficiency, increased ripple voltage at the output, and/or audio noise.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A power converter, comprising:

an energy transfer element coupled between a power converter input and a power converter output;

a power switch coupled to the energy transfer element and the power converter input;

a feedback sampling circuit coupled to receive a feedback signal representative of the power converter output to generate feedback signal samples during switching cycles;

a switch conduction scheduling circuit coupled to determine enabling and disabling of the power switch in a plurality of future switching cycles in response to the feedback signal samples for each present switching cycle and one or more past switching cycles; and a switch conduction control circuit coupled to enable or disable conduction of the power switch during a switching cycle to control an amount of energy transferred from the power converter input to the power converter output.

2. The power converter of claim 1 wherein the switch conduction scheduling circuit comprises a state machine coupled to determine switching of the power switch for future switching cycles in response to the feedback signal samples for each present switching cycle and the one or more past switching cycles.

3. The power converter of claim 1 further comprising a current sense circuit coupled to the power switch to sense a current through the power switch.

4. The power converter of claim 3 wherein the current sense circuit is coupled to terminate conduction of power switch in response to the current through the power switch.

5. The power converter of claim 4 wherein the switch conduction scheduling circuit is coupled to adjust a current limit of the power switch in response to the feedback signal samples for each present switching cycle and one or more past switching cycles.

6. The power converter of claim 1 wherein the feedback sampling circuit includes a sampling signal generator coupled to generate a delay time from an end of a conduction of the power switch before the feedback signal samples are sampled.

* * * * *